United States Patent
Ouyang et al.

(10) Patent No.: US 10,616,459 B2
(45) Date of Patent: Apr. 7, 2020

(54) METHOD AND DEVICE FOR DUAL-CAMERA-BASED IMAGING AND STORAGE MEDIUM

(71) Applicant: GUANGDONG OPPO MOBILE TELECOMMUNICATIONS CORP., LTD., Dongguan, Guangdong (CN)

(72) Inventors: Dan Ouyang, Dongguan (CN); Guohui Tan, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/166,638

(22) Filed: Oct. 22, 2018

(65) Prior Publication Data

US 2019/0166286 A1   May 30, 2019

(30) Foreign Application Priority Data

Nov. 30, 2017   (CN) .......................... 2017 1 1242048

(51) Int. Cl.
   *H04N 5/225*   (2006.01)
   *H04N 5/232*   (2006.01)

(52) U.S. Cl.
   CPC ......... *H04N 5/2257* (2013.01); *H04N 5/2258* (2013.01); *H04N 5/22525* (2018.08); *H04N 5/23212* (2013.01); *H04N 5/23232* (2013.01)

(58) Field of Classification Search
   CPC .............. H04N 5/2258; H04N 5/2257; H04N 5/23232; H04N 5/23212; H04N 5/22525; H04N 5/2351; H04N 5/23245
   See application file for complete search history.

(56) References Cited

U.S. PATENT DOCUMENTS

| 9,420,190 B2 | 8/2016 | Griffith et al. |
| 9,990,727 B2 | 6/2018 | Yoon et al. |
| 2010/0238327 A1 | 9/2010 | Griffith et al. |
| 2014/0118569 A1 | 5/2014 | Griffith et al. |

(Continued)

FOREIGN PATENT DOCUMENTS

| CN | 103871051 A | 6/2014 |
| CN | 104333700 A | 2/2015 |

(Continued)

OTHER PUBLICATIONS

International Search Report in international application No. PCT/CN2018/114921, dated Jan. 31, 2019.

(Continued)

*Primary Examiner* — Christopher K Peterson
(74) *Attorney, Agent, or Firm* — Ladas & Parry LLP

(57) ABSTRACT

A method and device for dual-camera-based imaging are provided, wherein the method includes that: after ambient luminance is determined, a main camera and auxiliary camera are determined from in dual cameras according to the ambient luminance, the main camera is used to shoot a first image, the auxiliary image is used to shoot a second image, a third image is generated according to the first image, depth information of the third image is calculated according to the first image and the second image, and blurring processing is further performed on the third image according to the depth information of the third image to obtain a fourth image.

16 Claims, 5 Drawing Sheets

(56) References Cited

U.S. PATENT DOCUMENTS

| | | |
|---|---|---|
| 2015/0097981 A1 | 4/2015 | Griffith et al. |
| 2015/0365604 A1 | 12/2015 | Griffith et al. |
| 2015/0365605 A1 | 12/2015 | Griffith et al. |
| 2016/0117829 A1 | 4/2016 | Yoon et al. |
| 2016/0205380 A1* | 7/2016 | Inoue ................ G06T 7/73 348/46 |
| 2016/0360103 A1 | 12/2016 | Griffith et al. |
| 2016/0366398 A1 | 12/2016 | Chen et al. |
| 2017/0118450 A1 | 4/2017 | Jung et al. |
| 2018/0227478 A1 | 8/2018 | Li |
| 2018/0241942 A1 | 8/2018 | Griffith et al. |
| 2018/0276833 A1 | 9/2018 | Yoon et al. |

FOREIGN PATENT DOCUMENTS

| | | |
|---|---|---|
| CN | 105100615 A | 11/2015 |
| CN | 106060423 A | 10/2016 |
| CN | 106254682 A | 12/2016 |
| CN | 106780330 A | 5/2017 |
| CN | 106791341 A | 5/2017 |
| CN | 106851104 A | 6/2017 |
| CN | 106952222 A | 7/2017 |
| CN | 106960413 A | 7/2017 |
| CN | 106993112 A | 7/2017 |
| CN | 107194963 A | 9/2017 |
| CN | 107959778 A | 4/2018 |
| EP | 3048787 A1 | 7/2016 |
| JP | 2013064772 A | 4/2013 |
| WO | 2016097468 A1 | 6/2016 |
| WO | 2016165488 A1 | 10/2016 |

OTHER PUBLICATIONS

Written Opinion of the International Search Authority in international application No. PCT/CN2018/114921, dated Jan. 31, 2019.
Supplementary European Search Report in European application No. 18204244.0, dated Jan. 22, 2019.
Notice of Allowance of the Chinese Application No. 201711242048.3, dated Jun. 26, 2019.
First Office Action for Chinese Application. No. 201711242048.3, dated Mar. 28, 2019.
English Abstract of CN 106060423 A.
English Abstract of CN 107194963 A.
English Abstract of JP 2013064772 A.

* cited by examiner

Auxiliary image     Main image     Disparity image

METHOD AND DEVICE FOR DUAL-CAMERA-BASED IMAGING AND STORAGE MEDIUM

CROSS-REFERENCE TO RELATED APPLICATION

This application claims priority to Chinese Patent Application No. 201711242048.3 filed on Nov. 30, 2017, the disclosure of which is incorporated by reference herein in its entirety.

TECHNICAL FIELD

The disclosure relates to the technical field of mobile terminals, and particularly to a method and device for dual-camera-based imaging and a storage medium.

BACKGROUND

Dual cameras have become widely used in mobile terminal devices. The dual cameras usually include a telephoto lens and a wide-angle lens. The telephoto lens is used to take a photo, while the wide-angle lens is used to assist in calculation of depth information of the photo, so as for subsequent image blurring processing.

The existing dual cameras have a good imaging effect in a high-luminance environment, but have a poor imaging effect in a dark environment.

BRIEF DESCRIPTION OF DRAWINGS

The abovementioned and/or additional aspects and advantages of the disclosure will become apparent and easy to understand from the descriptions made to the embodiments below in combination with the drawings.

DETAILED DESCRIPTION

Figure 1:
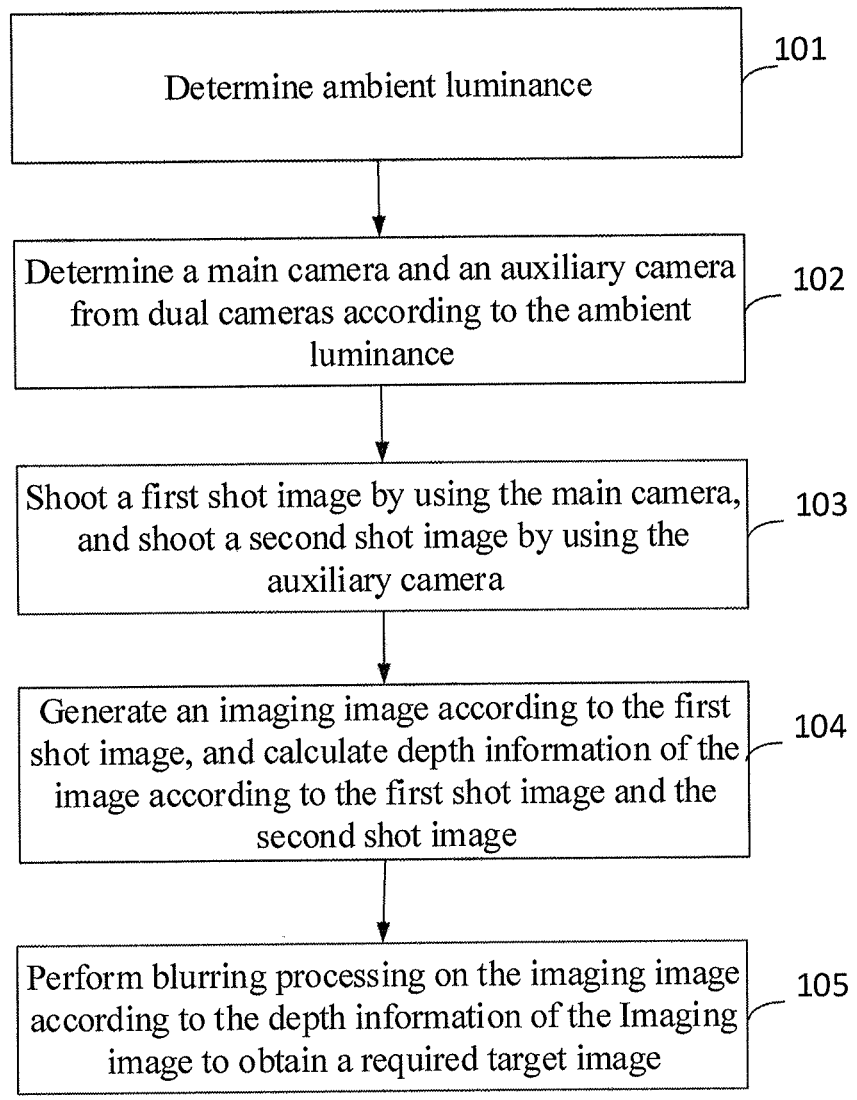
FIG. 1 illustrates a flowchart of a method for dual-camera-based imaging according to an embodiment of the disclosure.

The embodiments of the disclosure will be described below in detail. Examples of the embodiments are illustrated in the drawings and the same or similar reference signs always represent the same or similar components or components with the same or similar functions. The embodiments described below in combination with the drawings are exemplary and intended to explain the disclosure and should not be understood as limits to the disclosure.

Methods and devices for dual-camera-based imaging according to the embodiments of the disclosure will be described below in combination with the drawings.

The device for executing the imaging method according to the embodiments of the disclosure may be a hardware device with dual cameras, for example, a mobile phone, a tablet computer, a personal digital assistant and a wearable device. The wearable device may be a smart band, a smart watch, smart glasses and the like.

The hardware device with the dual cameras includes a shooting set, and the shooting set includes a first camera and a second camera. Each of the first camera and the second camera is provided with a lens, an image sensor and a voice coil motor. Each of the first camera and second camera in the dual cameras is connected with a camera connector, so that the voice coil motors are driven according to current values provided by the camera connectors, and the first camera and the second camera are driven by the voice coil motors to regulate distances between the lenses and the image sensors to implement focusing.

In the dual cameras provided in the embodiments, a resolution of the first camera is higher than that of the second camera, and a sensitivity (for example, an ISO value) of the second camera is higher than that of the first camera. Therefore, at first, merely the second camera may be used for focusing. When the second camera completes the focusing, a second driving current value of the motor of the second camera is acquired. Further, under the condition that the first camera and the second camera have the same focusing distance, a first driving current value of the motor of the first camera is determined according to the second driving current value. Then, the first driving current value is used to drive the first camera for focusing. Since the second camera is relatively low in resolution and thus has a high image processing speed, a focusing speed may be increased, and the technical problem of low focusing speed of dual cameras in the prior art is solved.

At a first aspect, a method for dual-camera-based imaging is provided, the dual cameras include a first camera and a second camera, the first camera has a resolution higher than that of the second camera, and has a sensitivity lower than that of the second camera, the method include the following actions. A main camera and an auxiliary camera are determined from the dual cameras according to an ambient luminance. A third image is generated according to a first image shot with the main camera. Depth information of the third image is calculated according to the first image and a second image shot with the auxiliary camera. Blurring processing is performed on the third image according to the depth information of the third image to obtain a fourth image.

In an example, in terms of determining the main camera and auxiliary camera from the dual cameras according to the ambient luminance, when the ambient luminance is higher than a luminance threshold, the first camera may be determined to be the main camera, and the second camera is determined to be the auxiliary camera; or when the ambient luminance is no higher than the luminance threshold, the second camera is determined to be the main camera, and the first camera may be determined to be the auxiliary camera.

In an example, in terms of generating the third image according to the first image, when the main camera has a field angle of view (FOV) smaller than or equal to that of the auxiliary camera, the first image may be determined to be the third image.

In an example, in terms of generating the third image according to the first image, when the main camera has a field angle of view (FOV) larger than that of the auxiliary camera, the first image may be cropped to get the third image having a same view as that of the second image.

In an example, in terms of determining the ambient luminance, International Organization for Standardization (ISO) values of the sensitivities of the first camera and the second camera may be read, and the ambient luminance may be determined according to the ISO values.

In an example, in terms of shooting the first image by using the main camera and shooting the second image by using the auxiliary camera, the following actions may be performed. The second camera may be driven for focusing. In response to the second camera completing the focusing, a second driving current value of a motor of the second camera may be acquired. A first driving current value of a motor of the first camera may be determined according to the second driving current value. The first camera may be driven for focusing using the first driving current value.

In an example, in terms of calculating depth information of the third image according to the first image and the second image, for a plurality of points in both the first image and the second image, a displacement of each of the plurality of points between the first image and second images may be calculated, and information related to the displacements may be regarded to be the depth information.

In an example, in terms of performing blurring processing on the third image according to the depth information of the third image, the following actions may be performed. A foreground region and a background region of the third image may be determined. First depth information of the foreground region and second depth information of the background region may be acquired according to the depth information and a focusing region. A blurring intensity may be generated according to the first depth information and the second depth information. Blurring processing may be performed on the background region of the third image according to the blurring intensity.

In an example, in terms of performing blurring processing on the background region of the third image according to the blurring intensity, a blurring coefficient of each pixel in the background region of the third image may be acquired according to the blurring intensity and depth information of the pixel, and blurring processing may be performed on the background region of the third image according to the blurring coefficient of each pixel. The blurring coefficient is related to the blurring intensity, and the higher the blurring coefficient is, the higher the blurring intensity is.

In an example, in terms of performing blurring processing on the third image according to the depth information of the third image, the following actions may be performed. A background region of the third image may be determined. Second depth information of the background region may be acquired according to the depth information and a focusing region. A difference between the second depth information of the background region of the third image and depth information of the focusing region may be acquired. A pre-stored mapping relationship between the differences and blurring intensities, to acquire a corresponding blurring intensity may be inquired according to the difference. Blurring processing may be performed on the background region of the third image according to the corresponding blurring intensity.

In an example, in terms of shooting the first image by using the main camera and shooting the second image by using the auxiliary camera, the following actions may be performed. The main camera and the auxiliary camera may be used simultaneously to continuously find a view and shoot, to obtain n frames of images shot by the main camera and m frames of images shot by the auxiliary camera respectively. Synthetic noise reduction may be performed on the n frames of images shot by the main camera to obtain the first image. The synthetic noise reduction may be performed on the m frames of images shot by the auxiliary camera to obtain the second image, where m and n are integers greater than 1.

In an example, in terms of performing the synthetic noise reduction, it may be determined that pixels of the shot images at a same position correspond to a noise point according to values of the pixels, and a correct color on the noise point may be estimated and pixel replacement processing is performed on the noise point.

In an example, in terms of performing the synthetic noise reduction, g values of pixels of the shot images at a same position may be read, and a weighted average of the values may be calculated as a value of a pixel of the obtained image at the same position.

In an example, in terms of calculating a weighted average of the values, a highest-resolution shot image may be selected from the shot images to be a basic frame, wherein the basic frame has a weight larger than those of other shot images.

In an example, before performing the synthetic noise reduction, the method may further include determining values of m and n according to the ambient luminance.

In an example, in terms of performing synthetic noise reduction on the n frames of images shot by the main camera to obtain the first image, and the synthetic noise reduction may be performed on the m frames of images shot by the auxiliary camera to obtain the second image, synthetic noise reduction may be performed through a first thread on the n frames of images shot by the main camera to obtain the first image, and meanwhile, the synthetic noise reduction may be performed through a second thread on the m frames of images shot by the auxiliary camera to obtain the second image.

In an example, the method may further include that, after performing the blurring processing, displaying the fourth image may be displayed on a display of a hardware device equipped with the dual cameras or communicatively connected to the dual cameras, automatically or in response to an operation of a user.

At a second aspect, a mobile terminal is provided. The mobile terminal includes a first camera, a second camera, a processor, a memory storing a computer program. The first camera has a resolution higher than that of the second camera, and a sensitivity lower than that of the second camera, and the computer program, when executed by the processor, cause the processor to implement one or more actions as described above in the first aspect and the examples thereof.

In an example, the first camera may have a same Field Angle of View (FOV) as that of the second camera, the first camera may be a 16M camera and the second camera may be a 5M camera.

At a third aspect, a non-transitory computer-readable storage medium may be provided. A computer program is stored in the non-transitory computer-readable storage medium, is executed by a processor to implement one or more actions as described above in the first aspect and the examples thereof.

FIG. 1 illustrates a flowchart of a method for dual-camera-based imaging according to an embodiment of the disclosure. As illustrated in FIG. 1, the method for dual-camera-based imaging includes the following operations illustrated in blocks. The method may begin at block 101.

At block 101, an ambient luminance is determined.

Specifically, in a possible implementation, an independent photometric device may be used to measure the ambient luminance.

In another possible implementation, sensitivities, i.e., International Organization for Standardization (ISO) values automatically regulated by a first camera and a second camera may be read and the ambient luminance is determined according to the read ISO values. In general, the first camera and the second camera should use the same ISO value, so that the corresponding ambient luminance may be determined by using the ISO value. However, if the read ISO value of the first camera and ISO value of the second camera are different from each other, the corresponding ambient luminance may be determined according to an average of the two.

It is to be noted that an ISO value is used to indicate the sensitivity of a camera. Common ISO values include 50, 100, 200, 400, 1,000 and the like. A camera may automatically regulate the ISO value according to the ambient luminance. Therefore, in the embodiment, the ambient luminance may be deduced from the ISO values. In general, under a sufficient light condition, the ISO value is 50 or 100, and under an insufficient light condition, the ISO value may be 400 or higher.

At block 102, a main camera and an auxiliary camera are determined from the dual cameras according to the ambient luminance.

Specifically, if the ambient luminance is higher than luminance threshold, the first camera is determined to be the main camera, and the second camera is determined to be the auxiliary camera. If the ambient luminance is no higher than the luminance threshold, the second camera is determined to be the main camera, and the first camera is determined to be the auxiliary camera.

This is because, under the condition that the ambient luminance is no higher than the luminance threshold, using the camera with a high resolution as the main camera for photographing would produce more noise due to insufficient light, thereby causing a poor imaging effect. Therefore, in case of insufficient light, the camera with a high sensitivity may be used as the main camera for photographing, to reduce noise in the image and improve the imaging effect.

On the contrary, under the condition that the ambient luminance is higher than the luminance threshold, there is sufficient light, the resolution of the camera with a high resolution is relatively high, and thus a relatively high-resolution image with less noise may be resulted. Therefore, the camera with a high resolution may be used as the main camera for photographing, and the camera with a high sensitivity is used as the auxiliary camera to calculate relatively accurate depth information. Therefore, the imaging effect is improved.

At block 103, the main camera is used to shoot a first shot image, and the auxiliary camera is used to shoot a second shot image.

Specifically, each of the main camera and the auxiliary camera is used to find a view and shoot, to obtain the first shot image for imaging and the second shot image for calculating depth information respectively.

Before shooting, an imaging image may be previewed. In a possible implementation, only a picture acquired by the main camera may be previewed, and a user, when viewing a satisfactory preview picture, clicks a shooting button, thereby controlling both the main camera and the auxiliary camera to find the view and shoot.

At block 104, an imaging image is generated according to the first shot image, and depth information of the imaging image is calculated according to the first shot image and the second shot image.

Specifically, since the first shot image and the second shot image are shot by different cameras respectively and there is a certain distance between the two cameras, a disparity is formed. According to a triangulation ranging principle, depth information of the same object in the first shot image and the second shot image, i.e., a distance between the object and a plane where the main and auxiliary cameras are located, may be calculated.

For clarifying the process, the triangulation ranging principle will be briefly introduced below.

Figure 2:
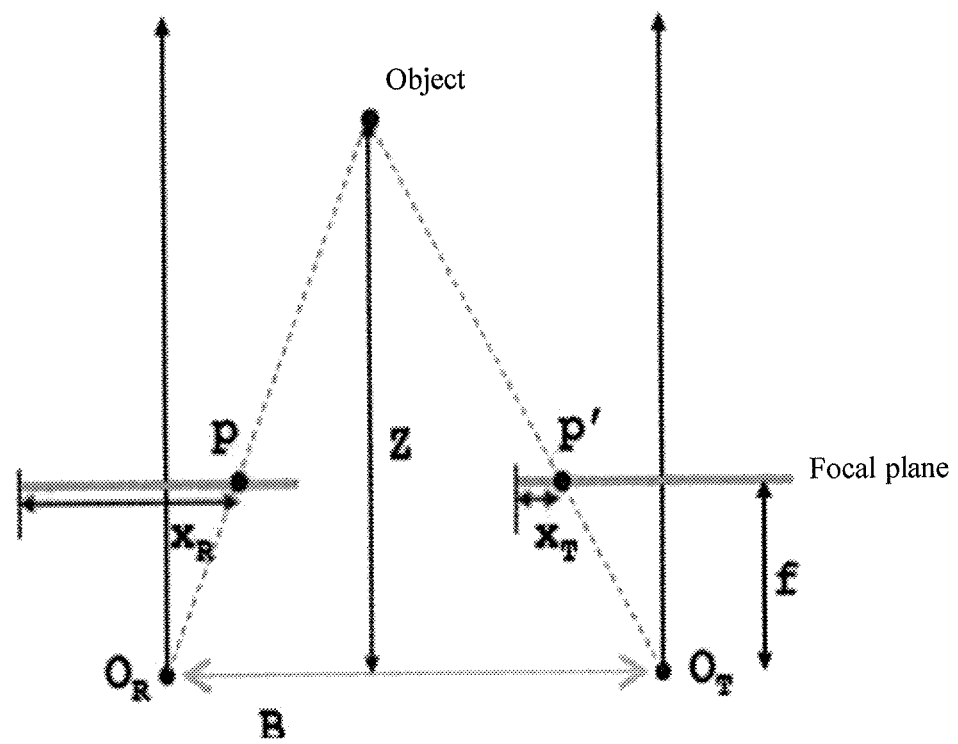
FIG. 2 illustrates a schematic diagram of a triangulation ranging principle.

In a practical scenario, a depth of a view feature is mainly resolved by binocular vision. This is the same as a principle of resolving the depth by dual cameras. In the embodiment, a main method for calculating the depth information of the imaging image according to the second shot image is the triangulation ranging principle. FIG. 2 illustrates a schematic diagram of the triangulation ranging principle.

In FIG. 2, an imaging object, positions $O_R$ and $O_T$ of the two cameras, and a focal plane of the two cameras are illustrated in a practical space. A distance between the focal plane and the plane where the two cameras are located is f. The two cameras perform imaging at a position of the focal plane, thereby obtaining two shot images.

P and P' are positions of the same object in different shot images respectively, where a distance between P and a left boundary of the corresponding shot image is $X_R$, and a distance between P' and a left boundary of the corresponding shot image is $X_T$. $O_R$ and $O_T$ represent the two cameras respectively, and the two cameras are located in the same plane and have a distance B.

On the basis of the triangulation ranging principle, the distance Z between the object and plane where the two cameras are located in FIG. 2 have the following relationship:

$$\frac{B}{Z} = \frac{(B + X_T) - X_R}{Z - f}.$$

On such a basis $$Z = \frac{B \cdot f}{X_R - X_T} = \frac{B \cdot f}{d}$$

may be calculated, where d is a distance difference between the positions of the same object in different shot images. Since B and f are fixed values, the distance Z of the object may be determined according to d.

Of course, depth information of a main image may be calculated in another manner which is different from the triangulation ranging method. For example, when the main camera and the auxiliary camera shoot the same scene, distances between an object in the scene and the cameras form a proportional relationship with a displacement difference, a posture difference and the like of imaging of the main camera and the auxiliary camera. Therefore, in the embodiment of the disclosure, the distance Z may be acquired according to this proportional relationship.

Figure 3:
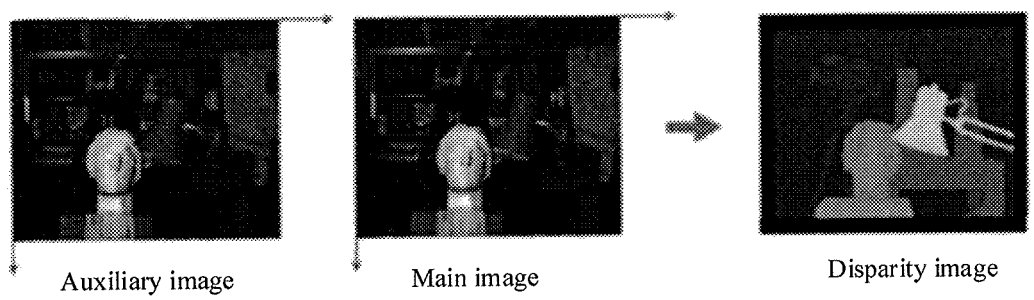
FIG. 3 illustrates a schematic diagram of a disparity image.

For example, as illustrated in FIG. 3, an image for differences of points in a main image acquired by the main camera and an auxiliary image acquired by the auxiliary camera is calculated and represented with a disparity image herein. This image illustrates displacement differences of the same points on the two images. However, a displacement difference in triangulation is directly proportional to Z. Therefore, a disparity image is directly used as a field depth image containing depth information.

On the basis of the above analysis, it can be seen that, when the dual cameras acquire the depth information, positions of the same object in different shot images are to be acquired. so that, if the two images configured to acquire the depth information are relatively close, depth information acquisition efficiency and accuracy may be improved.

At block 105, blurring processing is performed on the imaging image according to the depth information of the imaging image to obtain a required target image.

Specifically, after the depth information of the imaging image is calculated, whether each object is a foreground object or a background object may be determined according to depth information of the object in the imaging image. In general, when the depth information indicates that the object is relatively close to the plane where the main and auxiliary cameras are located and a depth value is relatively small, it may be determined that the object is a foreground object, otherwise the object is a background object.

Blurring processing may be performed on the recognized background to obtain a target image. In the target image, the foreground is more highlighted, the background is blurred, and a foreground-focused imaging effect is achieved.

When blurring processing is performed on a background region of the imaging image according to the depth information, the following processing manner may be used.

First depth information of a foreground region and second depth information of the background region may be acquired according to the depth information and a focusing region. A blurring intensity may be generated according to the first depth information and the second depth information. Blurring processing is performed on the background region of the imaging image according to the blurring intensity. In this way, different degrees of blurring may be implemented according to different depth information, to achieve a more natural and layering effect on the blurred image.

After a shot subject is focused, a spatial depth range where a high-resolution image may be formed for eyes before and after the focusing region where the subject is located is a field depth. It can be understood that a field depth range of imaging before the focusing region is the first depth information of the foreground region, and a field depth range of high-resolution imaging after the focusing region is the second depth information of the background region.

Blurring processing may be performed on the background region of the imaging image according to the blurring intensity in different implementation modes.

In a possible implementation, a blurring coefficient of each pixel is acquired according to the blurring intensity and depth information of each pixel in the background region of the imaging image. The blurring coefficient is related to the blurring intensity, and the higher the blurring coefficient is, the higher the blurring intensity is. For example, a product of the blurring intensity and the depth information of each pixel in the background region of the imaging image may be calculated to acquire the blurring coefficient of each pixel, and blurring processing is performed on the background region of the imaging image according to the blurring coefficient of each pixel.

In another possible implementation, the larger a difference value between the second depth information and depth information of the focusing region is, the longer a corresponding distance between the background region and the focusing region is, the lower the relevance between the background region and the focusing region is, and therefore the higher the corresponding blurring intensity is. In the example, a mapping relationship between a difference value of second depth information and depth information of a focusing region and a blurring intensity may be pre-stored. In the mapping relationship, the larger the difference value between the second depth information and the depth information of the focusing region is, the higher the corresponding blurring intensity is. Therefore, the difference value between the second depth information of the background region of the imaging image and the depth information of the focusing region is acquired, the mapping relationship is queried according to the difference value to acquire the corresponding blurring intensity, and the background region corresponding to the depth information is blurred according to the blurring intensity.

In the embodiment, after the ambient luminance is determined, the main camera and auxiliary camera are determined from the dual cameras according to the ambient luminance. The main camera is used to shoot the first shot image, and the auxiliary image is used to shoot the second shot image. The imaging image is generated according to the first shot image. The depth information of the imaging image is calculated according to the second shot image. Blurring processing is further performed on the imaging image according to the depth information of the imaging image to obtain the required target image. The camera with a high resolution is determined to be the first camera, the camera with a high sensitivity is determined to be the second camera, and each of the first camera and the second camera may be switched to be the main or auxiliary cameras according to the ambient luminance, so that performance of the main and auxiliary cameras may be matched with the current ambient luminance, and an imaging effect is ensured. Accordingly, the technical problem of relatively poor imaging effect of the dual cameras in a dark environment in the prior art is solved.

Figure 4:
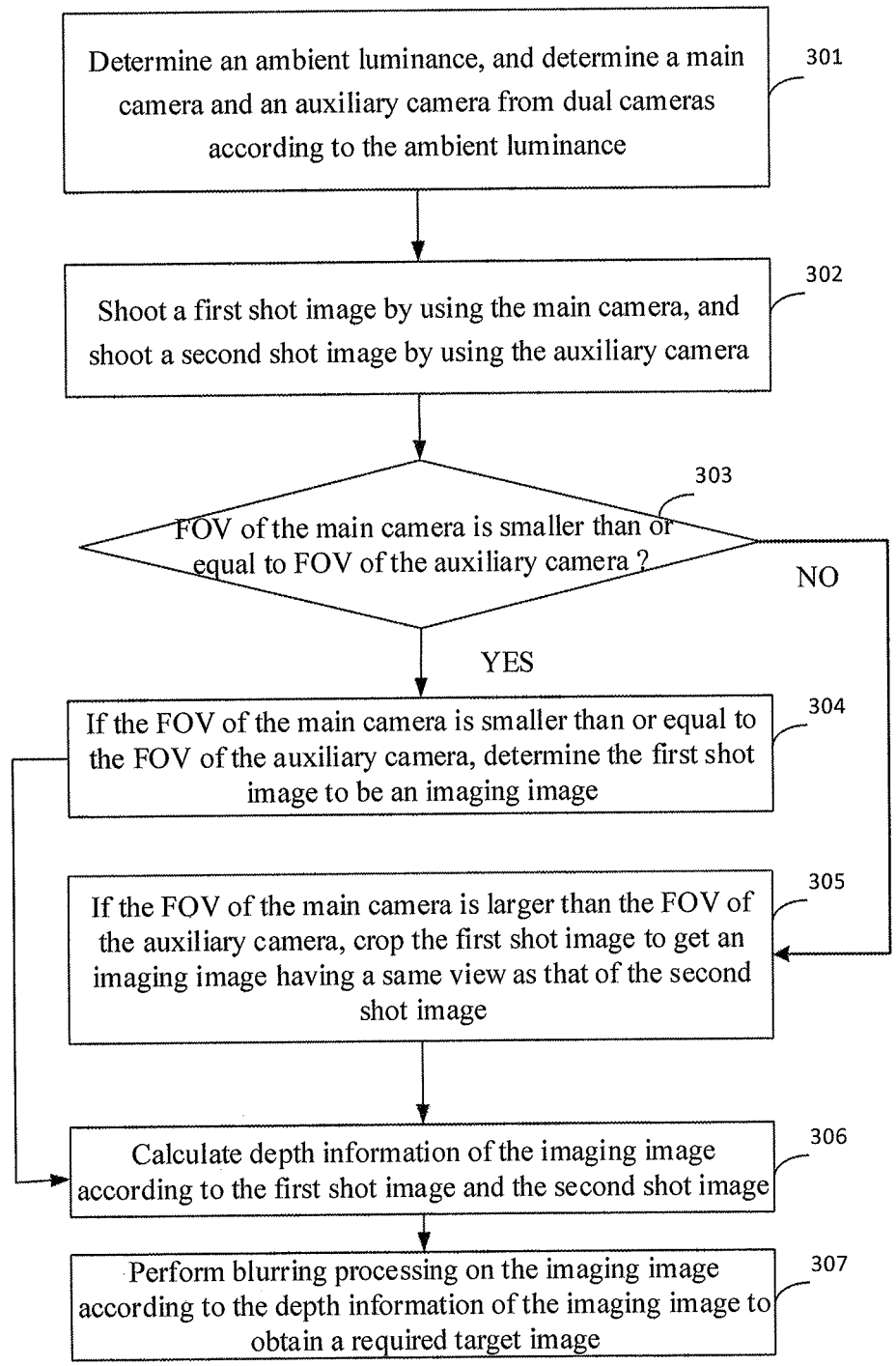
FIG. 4 illustrates a flowchart of another method for dual-camera-based imaging according to an embodiment of the disclosure.

In order to clearly describe the previous embodiment, an embodiment provides another method for dual-camera-based imaging. FIG. 4 illustrates a flowchart of another method for dual-camera-based imaging according to an embodiment of the disclosure.

As illustrated in FIG. 4, the method may include the following operations as illustrated in blocks. The method may begin at block 101.

At block 301, an ambient luminance is determined, and a main camera and an auxiliary camera are determined from dual cameras according to the ambient luminance.

The dual cameras include a first camera and a second camera, a resolution of the first camera is higher than that of the second camera, and a sensitivity (for example, an ISO value) of the second camera is higher than that of the first camera.

If the ambient luminance is higher than luminance threshold, the first camera is determined to be the main camera and the second camera is determined to be the auxiliary camera; and if the ambient luminance is lower than the luminance threshold, the second camera is determined to be the main camera and the first camera is determined to be the auxiliary camera.

For example, the first camera may be a 16M camera and the second camera may be a 5M camera or a four-in-one 5M camera.

It is to be noted that the four-in-one 5M camera is obtained by combining four 5M cameras and, has higher photometric performance compared with a single 5M camera.

At block 302, the main camera is used to shoot a first shot image, and the auxiliary camera is used to shoot a second shot image.

Specifically, in a possible implementation, under the condition that the ambient luminance is no higher than the luminance threshold, that is, the ambient luminance is not so high, an imaging effect may be influenced and there may be more noise in the images acquired by the main camera and the auxiliary camera.

For improving imaging quality, a multi-frame synthetic noise reduction manner may be used for image processing of the main camera and the auxiliary camera. Specifically, after the main camera and the auxiliary camera are determined, the main camera and the auxiliary camera may be simultaneously used to continuously find a view and shoot to obtain n frames of shot images shot by the main camera and m frames of shot images shot by the auxiliary camera respectively.

Synthetic noise reduction is performed on the n frames of shot images shot by the main camera to obtain the first shot image, and synthetic noise reduction is performed on the m frames of shot images shot by the auxiliary camera to obtain the second shot image.

For convenience of clearly understanding a multi-frame synthetic noise reduction process, multi-frame synthetic noise reduction will be briefly introduced below.

When the ambient light is insufficient, the imaging device such as a mobile terminal usually uses a manner of automatically improving the sensitivity. However, such a manner for improving the sensitivity results in more noise in an image. Multi-frame synthetic noise reduction is intended to reduce noise points in the image and improve quality of the image shot in a high-sensitivity condition. The principle is priori knowledge that noise points are arranged in a random order. Specifically, after multiple frames of shot images are continuously shot, a noise point appearing at the same position may be a red noise point or may be a green noise point or a white noise point or even there is no noise point, and thus comparison and selection may be performed. Pixels which are noises (i.e., noise points) may be selected according to values of pixels of the multiple frames of shot images at the same position. Furthermore, after the noise points are selected, color guessing (i.e., estimating the correct color for the noise points) and pixel replacement processing may further be performed on the noise points according to a further algorithm to achieve a noise point removal effect. By such a process, a noise reducing effect may be achieved with an extremely low image quality loss degree.

For example, as a relatively convenient method for multi-frame synthetic noise reduction, after multiple frames of shot images are acquired, values of pixels of the multiple frames of shot images at a same position may be read and a weighted average of these values of the pixel is calculated to generate a value of the pixel at the position in a synthetic image. In such a manner, a high-resolution image may be obtained.

The multiple frames of shot images include a frame of highest-resolution image and it may be determined to be a basic frame. For the basic frame, in a possible implementation, a weight of the basic frame may be higher than weights of the other shot images. That is, a function of recognizing and removing noise points in the basic frame with the other shot images as references is substantially realized.

Before multi-frame synthetic noise reduction, the frame numbers m and n for multi-frame synthesis may be determined according to the ambient luminance. If the ambient luminance is lower, the number of frames for synthesis is larger. That is, m and n have a reversed relationship with the ambient luminance. In a possible implementation, the values of m and n are the same, and range from 2 to 6.

For example,
when an ambient luminance level is dark, m=n=6;
when the ambient luminance level is general, m=n=4; and
when the ambient luminance level is bright, m=n=2;

It is to be noted that above classification of the ambient luminance level and the values of m and n are only exemplary and not intended to form limits to the embodiment. Those skilled in the art may understand that an optimal ambient luminance level classification manner and values of m and n may be determined by a limited number of tests.

In a possible application scenario, a relatively high processing speed is required. Since use of multi-frame synthetic noise reduction may prolong a processing duration, a multi-thread parallel processing mechanism may be employed in the application scenario.

Specifically, when a multi-thread parallel processing mechanism is started, synthetic noise reduction is performed on the n frames of shot images shot by the main camera through a first thread to obtain the first shot image, and meanwhile, synthetic noise reduction is performed on the m frames of shot images shot by the auxiliary camera through a second thread to obtain the second shot image.

At block 303, it is determined whether a Field Angle of View (FOV) of the main camera is smaller than or equal to an FOV of the auxiliary camera, if YES, block 304 is executed, otherwise block 305 is executed.

Specifically, an FOV is a maximum angle which may be covered by a lens. If an included angle between a field and a camera exceeds this angle, imaging may not be implemented. In the embodiment, the FOVs of the main and auxiliary cameras may be the same or may be different. However, because of different FOV values, differences between view finding of the first shot image and the second shot image are inconsistent. In other words, there may be some of the objects that are only imaged in one of the first shot image and the second shot image. During depth calculation, depth information of these objects may not be calculated. For facilitating calculation of the depth information, in the embodiment, the first shot image and/or the second shot image may be cropped, such that the cropped image may have a same view with the uncropped image, or the cropped images may have a same view, so that accuracy of the depth information of the imaging image is ensured.

At block 304, if the FOV of the main camera is smaller than or equal to the FOV of the auxiliary camera, the first shot image is determined to be a imaging image.

Specifically, if the FOV of the main camera is smaller than or equal to the FOV of the auxiliary camera, since the main camera and the auxiliary camera are usually located on the same plane, a view finding range of the main camera is narrower than or equal to a view finding range of the auxiliary camera. On such a basis, each object in the first shot image shot by the main camera should be imaged in the second shot image shot by the auxiliary camera. In this case, there is no need to crop the first shot image shot by the main camera, and the first shot image may directly be determined to be the imaging image.

At block 305, if the FOV of the main camera is larger than the FOV of the auxiliary camera, the first shot image is cropped to get the imaging image with a same view as that of the second shot image.

Specifically, if the FOV of the main camera is larger than the FOV of the auxiliary camera, since the main camera and the auxiliary camera are usually located on the same plane, the view finding range of the main camera is narrower than or equal to the view finding range of the auxiliary camera. On such a basis, there is a probability that some of the objects in the first shot image shot by the main camera is not shot by the auxiliary camera, that is, some of the objects do not exist in the second shot image. In this case, the first shot image shot by the main camera is to be cropped and the cropped image having a same view as that of the second shot image is taken as the imaging image.

At block 306, depth information of the imaging image is calculated according to the second shot image.

Specifically, the depth information of the imaging image is determined according to a position deviation of the same object in the second shot image and the first shot image and parameters of the dual cameras.

The specific calculation process may be seen from related descriptions about block 104 in the abovementioned embodiment and will not be elaborated in the embodiment.

At block 307, blurring processing is performed on the imaging image according to the depth information of the imaging image to obtain a required target image.

Specifically, after the depth information of the imaging image is calculated, it may be determined whether each object is a foreground or a background object according to depth information of the object in the imaging image. In general, when the depth information indicates that the object is relatively close to the plane where the main and auxiliary cameras are located and a depth value is relatively small, it may be determined that the object is a foreground object, otherwise the object is a background object. Furthermore, blurring processing may be performed on the recognized background to obtain the target image.

In the embodiment, after the ambient luminance is determined, the main camera and auxiliary camera are determined from the dual cameras according to the ambient luminance. The main camera is used to shoot the first shot image, and the auxiliary image is used to shoot the second shot image. The imaging image is generated according to the first shot image. The depth information of the imaging image is calculated according to the second shot image. Blurring processing is further performed on the imaging image according to the depth information of the imaging image to obtain the required target image. The camera with a high resolution is determined to be the first camera, the camera with a high sensitivity is determined to be the second camera, and each of the first camera and the second camera may be switched to be the main or auxiliary cameras according to the ambient luminance, so that performance of the main and auxiliary cameras may be matched with the current ambient luminance, and an imaging effect is ensured. Accordingly, the technical problem of relatively poor imaging effect of the dual cameras in a dark environment in the prior art is solved.

In order to implement the abovementioned embodiments, the disclosure further provides a dual-camera-based imaging device.

Figure 5:
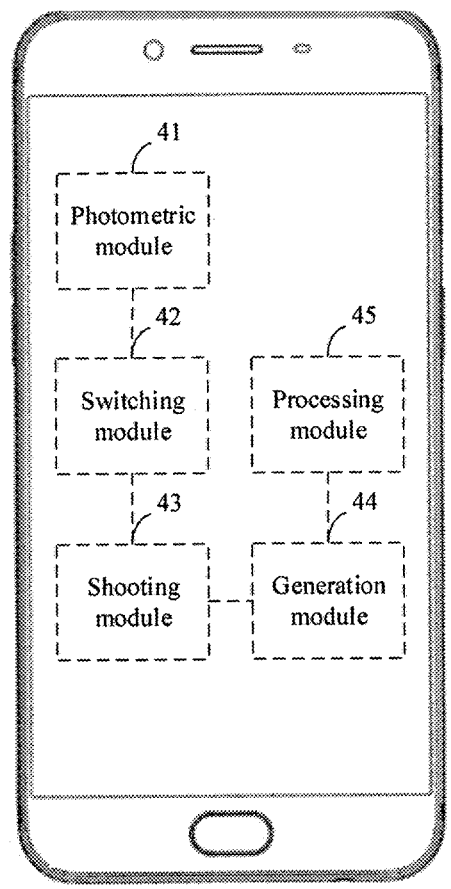
FIG. 5 illustrates a structure diagram of a dual-camera-based imaging device according to an embodiment of the disclosure.

FIG. 5 illustrates a structure diagram of a dual-camera-based imaging device according to an embodiment of the disclosure. The imaging device may be applied to a mobile terminal with dual cameras. The dual cameras include a first camera and a second camera, a resolution of the first camera is higher than that of the second camera, and a sensitivity (for example, an ISO value) of the second camera is higher than that of the first camera.

As illustrated in FIG. 5, the imaging device includes a photometric module 41, a switching module 42, a shooting module 43, a generation module 44 and a processing module 45.

The photometric module 41 is configured to determine an ambient luminance.

Specifically, the photometric module 41 is configured to determine the ambient luminance according to read ISO values of the first camera and the second camera.

The switching module 42 is configured to determine a main camera and auxiliary camera from the dual cameras according to the ambient luminance.

Specifically, the switching module 42 is configured to, when the ambient luminance is higher than luminance threshold, determine the first camera to be the main camera and determine the second camera to be the auxiliary camera; and when the ambient luminance is no higher than the luminance threshold, determine the second camera to be the main camera and determine the first camera to be the auxiliary camera.

The shooting module 43 is configured to use the main camera to shoot a first image and use the auxiliary camera to shoot a second image.

The generation module 44 is configured to generate a third image according to the first image and calculate depth information of the third image according to the first image and the second image.

The processing module 45 is configured to perform blurring processing on the third image according to the depth information of the third image to obtain a fourth image.

Furthermore, in a possible implementation of the embodiment of the disclosure, the generation module 44 may be configured to, when a FOV of the main camera is smaller than or equal to an FOV of the auxiliary camera, determine the first image to be the third image; and when the FOV of the main camera is larger than the FOV of the auxiliary camera, crop the first image to get the third image with a same view as that of the second image.

It is to be noted that explanations and descriptions about the abovementioned method embodiment are also applied to the device of the embodiment and will not be elaborated herein.

In the embodiment, after the ambient luminance is determined, the main camera and auxiliary camera are determined from the dual cameras according to the ambient luminance, the main camera is used to shoot the first image, the auxiliary image is used to shoot the second image, the third image is generated according to the first image, the depth information of the third image is calculated according to the first image and the second image, and blurring processing is further performed on the third image according to the depth information of the third image to obtain the fourth image. The camera with a high resolution is determined to be the first camera, the camera with a high sensitivity is determined to be the second camera, and the first camera and the second camera can be switched to be the main or auxiliary cameras according to the ambient luminance, so that performance of the main and auxiliary cameras may be matched with the present ambient luminance, an imaging effect is ensured, and the technical problem of relatively poor imaging effect of the dual cameras in a dark environment in the prior art is solved.

Figure 6:
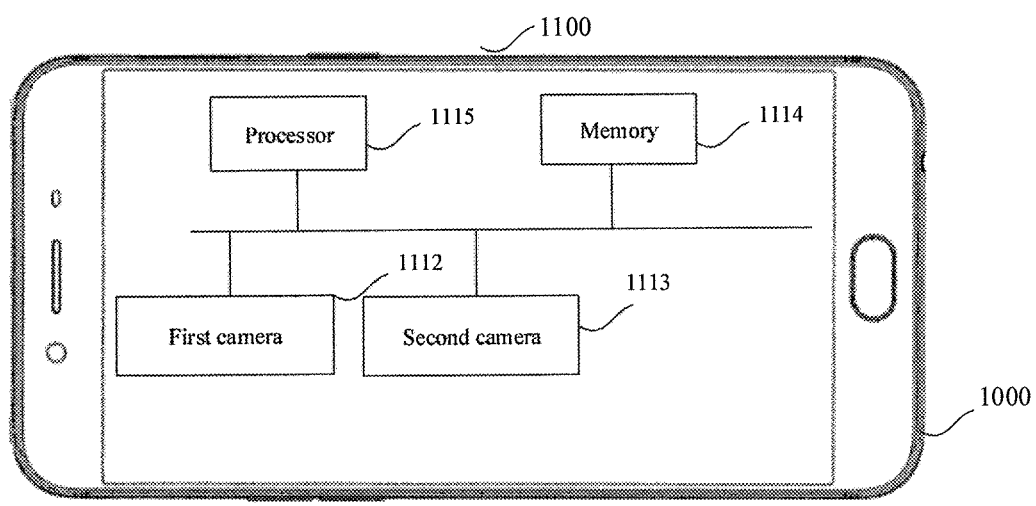
FIG. 6 illustrates a structure diagram of a terminal device according to another embodiment of the disclosure.

In order to implement the abovementioned embodiments, the disclosure further discloses a mobile terminal. FIG. 6 illustrates a structure diagram of a terminal device according to another embodiment of the disclosure. As illustrated in FIG. 6, the terminal device 1000 includes a housing 1100, and a first camera 1112, a second camera 1113, a memory 1114 and a processor 1115 which are located in the housing 1100.

An executable program code is stored in the memory 1114, and the processor 1115 reads the executable program code stored in the memory 1114 to run a program corresponding to the executable program code to implement the method for dual-camera-based imaging of the abovementioned embodiments.

The resolution of the first camera is higher than that of the second camera, and the sensitivity of the second camera is higher than that of the first camera.

In a possible implementation, an FOV of the first camera may be the same as an FOV of the second camera. In this case, a process of cropping a first shot image to get an imaging image is eliminated, thus increasing the image processing speed.

For endowing a high resolution to the first camera, a 16M camera may be used. Of course, another camera with a high resolution may be used. There are no limits made thereto in the embodiment.

In addition, for endowing a high sensitivity to the second camera, a four-in-one 5M camera may be used. Of course, another camera with a high sensitivity may be used. There are no limits made thereto in the embodiment.

In order to implement the abovementioned embodiments, the disclosure further discloses a computer-readable storage medium, on which a computer program is stored. The program is executed by a processor of a mobile terminal to implement the method for dual-camera-based imaging in the abovementioned embodiments.

Figure 7:
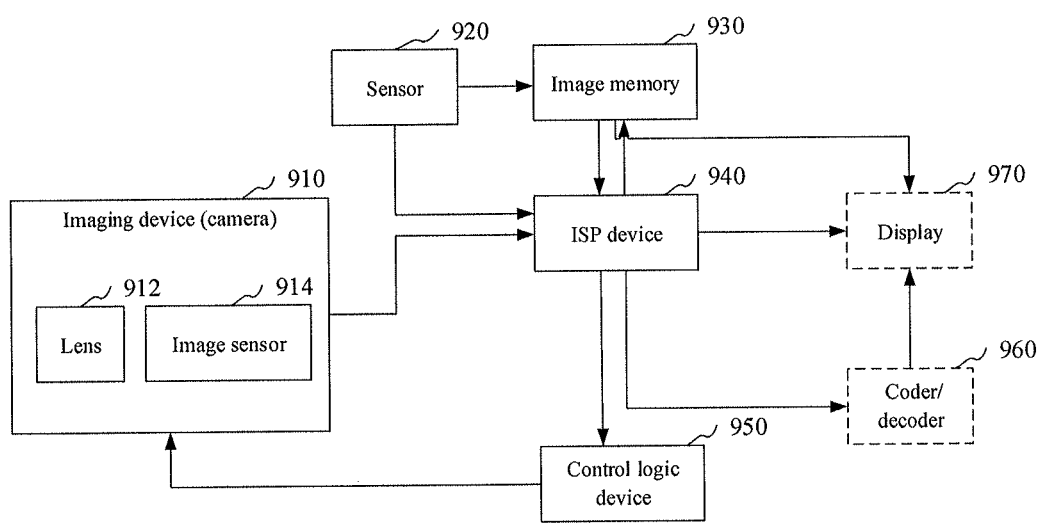
FIG. 7 illustrates a schematic diagram of an image processing circuit according to an embodiment.

The mobile terminal further includes an image processing circuit, and the image processing circuit may be implemented by use of hardware and/or software components, and may include various processing units defining an Image Signal Processing (ISP) pipeline. FIG. 7 illustrates a schematic diagram of an image processing circuit according to an embodiment. As illustrated in FIG. 7, various aspects of the image processing technology related to the embodiments of the disclosure are illustrated, for convenience of description.

As illustrated in FIG. 7, the image processing circuit includes an ISP device 940 and a control logic device 950. Image data captured by an imaging device 910 is processed by the ISP device 940 at first, and the ISP device 940 analyzes the image data to capture image statistical information for determining one or more control parameters of the ISP device and/or the imaging device 910. The imaging device 910 may specifically include two cameras, and each camera may include one or more lenses 912 and an image sensor 914. The image sensor 914 may include a color filter array (for example, a Bayer filter), and the image sensor 914 may acquire light intensity and wavelength information captured by each imaging pixel of the image sensor 914 and provide a set of original image data processible by the ISP device 940. A sensor 920 may provide the original image data to the ISP device 940 on the basis of an interface type of the sensor 920. An interface of the sensor 920 may use a Standard Mobile Imaging Architecture (SMIA) interface, another serial or parallel camera interface or a combination of the interfaces.

The ISP device 940 processes the original image data pixel by pixel according to multiple formats. For example, each image pixel may have a bit depth of 8, 10, 12 or 14 bits. The ISP device 940 may execute one or more image processing operations on the original image data and collect the image statistical information about the image data. The image processing operations may be executed according to the same or different bit depth accuracy.

The ISP device 940 may further receive the pixel data from an image memory 930. For example, the interface of the sensor 920 sends the original pixel data to the image memory 930, and the original pixel data in the image memory 930 is provided for the ISP device 940 for processing. The image memory 930 may be a part of a memory device, a storage device or an independent dedicated memory in an electronic device, and may include a Direct Memory Access (DMA) feature.

When receiving the original image data from the interface of the sensor 920 or from the image memory 930, the ISP device 940 may execute the one or more image processing operations, for example, time-domain filtering. The processed image data may be sent to the image memory 930 for other processing before displaying. The ISP device 940 receives the processed data from the image memory 930 and performs image data processing in an original domain and color spaces Red, Green and Blue (RGB) and YCbCr on the processed data. The processed image data may be output to a display 970 for a user to view and/or for further processing by a Graphics Processing Unit (GPU). In addition, output of the ISP device 940 may further be sent to the image memory 930, and the display 970 may read the image data from the image memory 930. In an embodiment, the image memory 930 may be configured to implement one or more frame buffers. Moreover, the output of the ISP device 940 may be sent to a coder/decoder 960 to code/decode the image data. The coded image data may be stored, and is decompressed before being displayed on the display 970. The coder/decoder 960 may be implemented by a Central Processing Unit (CPU) or a GPU or a coprocessor.

The statistical information determined by the ISP device 940 may be sent to the control logic device 950. For example, the statistical information may include statistical information of automatic exposure, automatic white balance, automatic focusing, flashing detection, black level compensation, shading correction of the lens 912 and the like of the image sensor 914. The control logic device 950 may include a processor and/or microcontroller executing one or more routines (for example, firmware), and the one or more routines may determine the control parameter of the imaging device 910 and the control parameter of the ISP device according to the received statistical data. For example, the control parameter may include a control parameter (for example, integral time for gain and exposure control) for the sensor 920, a camera flashing control parameter, a control parameter (for example, a focal length for focusing or zooming) for the lens 912 or a combination of these parameters. The control parameter for the ISP device may include a gain level and color correction matrix for automatic white balance and color regulation (for example, during RGB processing) and a shading correction parameter for the lens 912.

In the descriptions of the specification, the descriptions made with terms "an embodiment", "some embodiments", "example", "specific example", "some examples" or the like refer to that specific features, structures, materials or characteristics described in combination with the embodiment or the example are included in at least one embodiment or example of the disclosure. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only used for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, "multiple" means at least two, for example, two and three, unless otherwise limited definitely and specifically.

Any process or method in the flowcharts or described herein in another manner may be understood to represent a module, segment or part including codes of one or more executable instructions configured to realize specific logic functions or operations of the process and, moreover, the scope of the preferred implementation mode of the disclosure includes other implementation, not in a sequence illustrated or discussed herein, including execution of the functions basically simultaneously or in an opposite sequence according to the involved functions. This may be understood by those skilled in the art of the embodiments of the disclosure.

Logics and/or operations represented in the flowcharts or described herein in another manner, for example, may be considered as a fixed sequence list of executable instructions configured to realize the logic functions and may specifically implemented in any computer-readable medium for an instruction execution system, device or device (for example, a computer-based system, a system including a processor or another system capable of reading instructions from the instruction execution system, device or device and executing the instructions) to use or for use in combination with the instruction execution system, device or device. For the specification, "computer-readable medium" may be any device capable of including, storing, communicating with, propagating or transmitting a program for the instruction execution system, device or device to use or for use in combination with the instruction execution system, device or device. A more specific example (non-exhaustive list) of the computer-readable medium includes: an electric connection portion (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It is to be understood that each part of the disclosure may be implemented by hardware, software, firmware or a combination thereof. In the abovementioned implementation modes, multiple operations or methods may be implemented by software or firmware stored in a memory and executed by a proper instruction execution system. For example, in case of implementation with the hardware, like another implementation mode, any one or combination of the following technologies well-known in the art may be used for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the operations in the method of the abovementioned embodiment may be completed through related hardware instructed by a program, the program may be stored in a computer-readable storage medium, and when the program is executed, one or combination of the operations of the method embodiment is included.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium.

The storage medium may be a read-only memory, a magnetic disk, an optical disk or the like. The embodiments of the disclosure have been illustrated or described above. However, it can be understood that the abovementioned embodiments are exemplary and should not be understood as limits to the disclosure and those of ordinary skill in the art may make variations, modifications, replacements, transformations to the abovementioned embodiments within the scope of the disclosure.

The invention claimed is:

1. A method for dual-camera-based imaging, wherein the dual cameras comprise a first camera and a second camera, the first camera has a resolution higher than that of the second camera, and has a sensitivity lower than that of the second camera, the method comprises:
 determining ambient luminance;
 determining a main camera and an auxiliary camera from the dual cameras according to the ambient luminance;
 simultaneously using the main camera and the auxiliary camera to continuously find a view and shoot, to obtain n frames of images shot by the main camera and m frames of images shot by the auxiliary camera respectively, performing synthetic noise reduction on the n frames of images shot by the main camera to obtain a first image; and performing the synthetic noise reduction on the m frames of images shot by the auxiliary camera to obtain a second image, wherein m and n are integers greater than 2 and have a reversed relationship with the ambient luminance;
 generating a third image according to the first image;
 calculating depth information of the third image according to the first image and the second image; and
 performing blurring processing on the third image according to the depth information of the third image to obtain a fourth image.

2. The method according to claim 1, wherein determining the main camera and auxiliary camera from the dual cameras according to the ambient luminance comprises:
 when the ambient luminance is higher than a luminance threshold, determining the first camera to be the main camera, and determining the second camera to be the auxiliary camera; or when the ambient luminance is no higher than the luminance threshold, determining the second camera to be the main camera, and determining the first camera to be the auxiliary camera.

3. The method according to claim 1, wherein generating the third image according to the first image comprises:
when the main camera has a field angle of view (FOV) smaller than or equal to that of the auxiliary camera, determining the first image to be the third image.

4. The method according to claim 1, wherein generating the third image according to the first image comprises:
when the main camera has a field angle of view (FOV) larger than that of the auxiliary camera, cropping the first image to get the third image having a same view as that of the second image.

5. The method according to claim 1, further comprising:
reading International Organization for Standardization (ISO) values of the sensitivities of the first camera and the second camera; and
determining the ambient luminance according to the ISO values.

6. A mobile terminal, comprising:
a first camera,
a second camera,
a processor,
a memory storing a computer program,
wherein the first camera has a resolution higher than that of the second camera, and a sensitivity lower than that of the second camera, and
wherein the computer program, when executed by the processor, cause the processor to implement a method for dual-camera-based imaging, wherein the dual cameras comprise the first camera and the second camera, the method comprising:
determining ambient luminance;
determining a main camera and an auxiliary camera from the dual cameras according to the ambient luminance;
simultaneously using the main camera and the auxiliary camera to continuously find a view and shoot, to obtain n frames of images shot by the main camera and m frames of images shot by the auxiliary camera respectively, performing synthetic noise reduction on the n frames of images shot by the main camera to obtain a first image; and performing the synthetic noise reduction on the m frames of images shot by the auxiliary camera to obtain a second image, wherein m and n are integers greater than 2 and have a reversed relationship with the ambient luminance;
generating a third image according to the first image;
calculating depth information of the third image according to the first image and the second image; and
performing blurring processing on the third image according to the depth information of the third image to obtain a fourth image.

7. The mobile terminal according to claim 6, wherein the first camera has a same Field Angle of View (FOV) as that of the second camera,
wherein the first camera is a 16M camera and the second camera is a 5M camera.

8. The mobile terminal according to claim 6, wherein determining the main camera and auxiliary camera from the dual cameras according to the ambient luminance comprises:

when the ambient luminance is higher than a luminance threshold, determining the first camera to be the main camera, and determining the second camera to be the auxiliary camera; or
when the ambient luminance is no higher than the luminance threshold, determining the second camera to be the main camera, and determining the first camera to be the auxiliary camera.

9. The mobile terminal according to claim 6, wherein generating the third image according to the first image comprises:
when the main camera has a field angle of view (FOV) smaller than or equal to that of the auxiliary camera, determining the first image to be the third image.

10. The mobile terminal according to claim 6, wherein generating the third image according to the first image comprises:
when the main camera has a field angle of view (FOV) larger than that of the auxiliary camera, cropping the first image to get the third image having a same view as that of the second image.

11. The mobile terminal according to claim 6, the method further comprising:
reading International Organization for Standardization (ISO) values of the sensitivities of the first camera and the second camera; and
determining the ambient luminance according to the ISO values.

12. A non-transitory computer-readable storage medium, in which a computer program is stored, wherein the computer program is executed by a processor to implement a method for dual-camera-based imaging, wherein the dual cameras comprise a first camera and a second camera, the first camera has a resolution higher than that of the second camera, and has a sensitivity lower than that of the second camera, the method comprising:
determining ambient luminance;
determining a main camera and an auxiliary camera from the dual cameras according to the ambient luminance;
simultaneously using the main camera and the auxiliary camera to continuously find a view and shoot, to obtain n frames of images shot by the main camera and m frames of images shot by the auxiliary camera respectively, performing synthetic noise reduction on the n frames of images shot by the main camera to obtain a first image, and performing the synthetic noise reduction on the m frames of images shot by the auxiliary camera to obtain a second image, wherein m and n are integers greater than 2 and have a reversed relationship with the ambient luminance;
generating a third image according to the first image;
calculating depth information of the third image according to the first image and the second image; and
performing blurring processing on the third image according to the depth information of the third image to obtain a fourth image.

13. The non-transitory computer-readable storage medium according to claim 12, wherein determining the main camera and auxiliary camera from the dual cameras according to the ambient luminance comprises:
when the ambient luminance is higher than a luminance threshold, determining the first camera to be the main camera, and determining the second camera to be the auxiliary camera; or when the ambient luminance is no higher than the luminance threshold, determining the second camera to be the main camera, and determining the first camera to be the auxiliary camera.

14. The non-transitory computer-readable storage medium according to claim 12, wherein generating the third image according to the first image comprises:
when the main camera has a field angle of view (FOV) smaller than or equal to that of the auxiliary camera, determining the first image to be the third image.

15. The non-transitory computer-readable storage medium according to claim 12, wherein generating the third image according to the first image comprises:
when the main camera has a field angle of view (FOV) larger than that of the auxiliary camera, cropping the first image to get the third image having a same view as that of the second image.

16. The non-transitory computer-readable storage medium according to claim 12, the method further comprising:
reading International Organization for Standardization (ISO) values of the sensitivities of the first camera and the second camera; and
determining the ambient luminance according to the ISO values.

* * * * *